US012633182B2

(12) United States Patent
Fukumoto

(10) Patent No.: US 12,633,182 B2
(45) Date of Patent: May 19, 2026

(54) IN-VEHICLE DEVICE, INFORMATION PROCESSING DEVICE, SENSOR DATA TRANSMISSION METHOD, AND INFORMATION PROCESSING METHOD

(71) Applicant: Panasonic Automotive Systems Co., Ltd., Kanagawa (JP)

(72) Inventor: Satoshi Fukumoto, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 90 days.

(21) Appl. No.: 18/653,537

(22) Filed: May 2, 2024

(65) Prior Publication Data

US 2024/0282155 A1     Aug. 22, 2024

Related U.S. Application Data

(63) Continuation of application No. PCT/JP2022/026857, filed on Jul. 6, 2022.

(30) Foreign Application Priority Data

Nov. 11, 2021     (JP) ................................. 2021-184028

(51) Int. Cl.
*G07C 5/08*        (2006.01)
*G07C 5/00*        (2006.01)
(Continued)

(52) U.S. Cl.
CPC ........... *G07C 5/0816* (2013.01); *G07C 5/008* (2013.01); *H04N 19/115* (2014.11); *H04N 19/172* (2014.11)

(58) Field of Classification Search
CPC .... G07C 5/0816; G07C 5/008; H04N 19/115; H04N 19/172; H04N 19/134;
(Continued)

(56) References Cited

U.S. PATENT DOCUMENTS

2009/0043451 A1*   2/2009   Harder ................... B60G 17/08
                                                          701/37
2011/0267452 A1*  11/2011   Notsu .................. H04N 19/115
                                                          382/104
(Continued)

FOREIGN PATENT DOCUMENTS

JP          2005151352 A      6/2005
JP          2016085619 A      5/2016
(Continued)

OTHER PUBLICATIONS

English Translation of International Search Report dated Sep. 27, 2022, for the corresponding International Patent Application No. PCT/JP2022/026857, 3 pages.

*Primary Examiner* — Benjamin M Thieu
(74) *Attorney, Agent, or Firm* — Seed Intellectual Property Law Group LLP

(57)          ABSTRACT

An in-vehicle device according to the present disclosure includes a processor, and a memory. The memory having instructions that, when executed by the processor, cause the processor to perform operations: acquiring vehicle state information indicating a state of a vehicle, and sensor data measured by a sensor provided on the vehicle, compressing the sensor data at a compression rate varying depending on the vehicle state information, and transmitting the compression rate in association with the compressed sensor data. The vehicle state information includes at least vehicle speed of the vehicle. The compression rate is a value determined according to whether the vehicle speed is higher than a first threshold.

10 Claims, 9 Drawing Sheets

(51) Int. Cl.
    *H04N 19/115*     (2014.01)
    *H04N 19/172*     (2014.01)

(58) Field of Classification Search
    CPC ........... B60W 60/00; G08G 1/00; G08G 1/16;
                                        G16Y 10/40; G16Y 10/75
    See application file for complete search history.

(56) References Cited

U.S. PATENT DOCUMENTS

| | | | |
|---|---|---|---|
| 2016/0117848 A1 | 4/2016 | Hattori et al. | |
| 2019/0202447 A1 | 7/2019 | Taniguchi et al. | |
| 2020/0177885 A1* | 6/2020 | Brugman | H04N 19/31 |
| 2020/0344470 A1* | 10/2020 | Shen | H04L 43/0894 |
| 2020/0348665 A1* | 11/2020 | Bhanushali | H04N 19/167 |
| 2020/0356108 A1 | 11/2020 | Toma et al. | |
| 2021/0063200 A1* | 3/2021 | Kroepfl | G01C 21/3841 |
| 2021/0152997 A1* | 5/2021 | Manivasagam | G08G 1/163 |
| 2021/0192250 A1 | 6/2021 | Matono et al. | |
| 2021/0400241 A1* | 12/2021 | Yamanaka | B60R 1/26 |
| 2022/0126864 A1* | 4/2022 | Moustafa | B60W 60/0013 |
| 2022/0182498 A1* | 6/2022 | Singh | G08G 1/16 |
| 2022/0327819 A1 | 10/2022 | Hagiwara | |

FOREIGN PATENT DOCUMENTS

| | | |
|---|---|---|
| JP | 2018007038 A | 1/2018 |
| JP | 2020107291 A | 7/2020 |
| JP | 2021111273 A | 8/2021 |
| WO | WO 2017163606 A1 | 9/2017 |
| WO | WO 2018047231 A1 | 3/2018 |
| WO | WO 2019151427 A1 | 8/2019 |
| WO | WO 2021131064 A1 | 7/2021 |

* cited by examiner

SENSOR DATA
+
METADATA
(COMPRESSION RATE,
FRAME RATE,
RESOLUTION,
ETC.)

VEHICLE
CONTROL DATA

2

1

IN-VEHICLE DEVICE, INFORMATION PROCESSING DEVICE, SENSOR DATA TRANSMISSION METHOD, AND INFORMATION PROCESSING METHOD

CROSS-REFERENCE TO RELATED APPLICATIONS

This application is a continuation of International Application No. PCT/JP2022/026857, filed on Jul. 6, 2022 which claims the benefit of priority of the prior Japanese Patent Application No. 2021-184028, filed on Nov. 11, 2021, the entire contents of which are incorporated herein by reference.

FIELD

The present disclosure relates to an in-vehicle device, an information processing device, a sensor data transmission method, and an information processing method.

BACKGROUND

There has been known a technique for transmitting sensor data measured by various sensors provided on a vehicle from an in-vehicle device to a cloud server or an edge server.

A related technique is described in JP 2020-107291 A.

The present disclosure provides an in-vehicle device, an information processing device, a sensor data transmission method, and an information processing method that enable execution of processing depending on a compression rate of sensor data.

SUMMARY

An in-vehicle device according to the present disclosure includes a processor, and a memory. The memory having instructions that, when executed by the processor, cause the processor to perform operations comprising: acquiring vehicle state information indicating a state of a vehicle, and sensor data measured by a sensor provided on the vehicle, compressing the sensor data at a compression rate varying depending on the vehicle state information, and transmitting the compression rate in association with the compressed sensor data. The vehicle state information includes at least vehicle speed of the vehicle. The compression rate is a value determined according to whether the vehicle speed is higher than a first threshold.

DETAILED DESCRIPTION

Embodiments of an in-vehicle device and an information processing device according to the present disclosure are explained below with reference to the drawings.

First Embodiment

Figure 1:
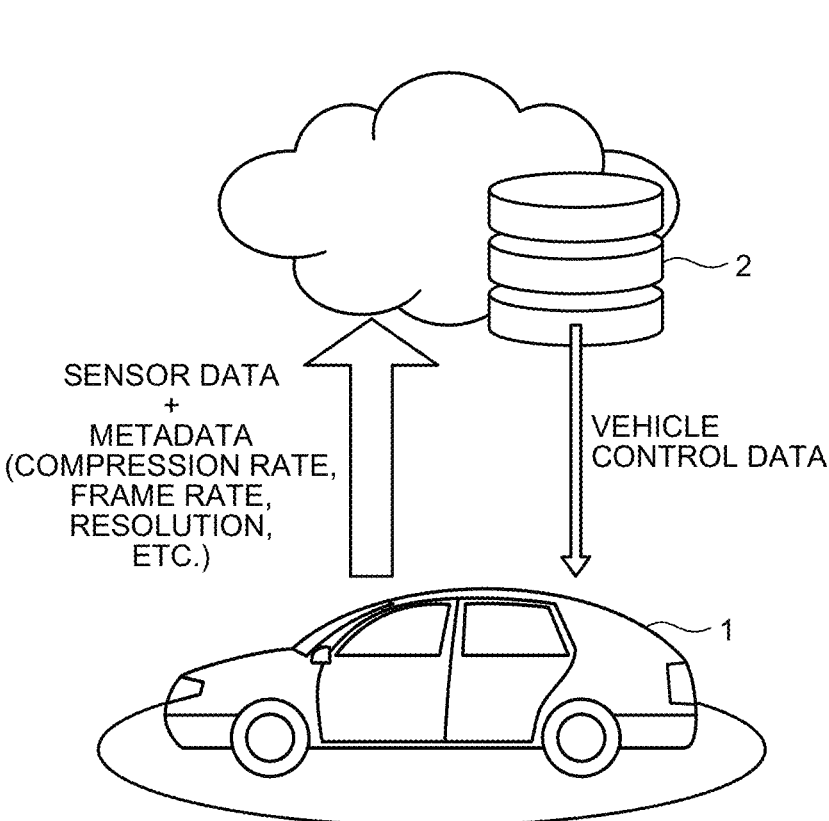
FIG. 1 is a diagram illustrating an example of information communication between a vehicle and a cloud server according to a first embodiment.

FIG. 1 is a diagram illustrating an example of information communication between a vehicle 1 and a cloud server 2 according to the first embodiment. The vehicle 1 and the cloud server 2 are connected via a network such as the Internet. As illustrated in FIG. 1, the vehicle 1 in the present embodiment transmits metadata such as a compression rate, a frame rate, and resolution together with sensor data to the cloud server 2.

The cloud server 2 is provided in a cloud environment. The cloud server 2 is an example of an information processing device in the present embodiment.

The cloud server 2 executes processing such as ADAS (Advanced Driver-Assistance Systems) based on the sensor data according to the metadata of the sensor data transmitted from the vehicle 1. For example, the cloud server 2 changes a threshold used for processing, a processing algorithm, or a learning model used for learning the sensor data according to the compression rate of the sensor data.

The ADAS processing executed by the cloud server 2 is, for example, ACC (Adaptive Cruise Control System: adaptive cruise control), FCW (Forward Collision Warning), AEBS (Advanced Emergency Braking System: collision damage reduction braking control device), PD (Pedestrian Detection), TSR (Traffic Sign Recognition), LDW (Lane Departure Warning), free space detection, automatic parking, and automated valet parking (AVP), but is not limited thereto.

The cloud server 2 transmits vehicle control data for controlling traveling of the vehicle 1 to the vehicle 1 based on, for example, the sensor data received from the vehicle 1 and the metadata of the sensor data. Besides the vehicle control data for controlling traveling of the vehicle 1, the cloud server 2 may perform information provision or the like to a driver of the vehicle 1.

The sensor data in the present embodiment includes at least image data obtained by an in-vehicle camera mounted on the vehicle 1 imaging the surroundings of the vehicle 1. The frame rate included in the metadata of the sensor data is a frame rate of the image data and the resolution is resolution of the image data. Note that the sensor data may include measurement data by various sensors besides the image data. For example, the sensor data may include distance measurement data of the distance between an obstacle around the vehicle 1 and the vehicle 1 by a sonar or a radar mounted on the vehicle 1.

Note that, when "obstacle" is referred to in the present embodiment, "obstacle" includes an object, a building, a person such as a pedestrian, a bicycle, and other vehicles. Although the cloud server 2 is illustrated in FIG. 1, an edge server may be used instead of the cloud server 2 or in addition to the cloud server 2.

Next, a configuration of the vehicle 1 in the present embodiment is explained.

Figure 2:
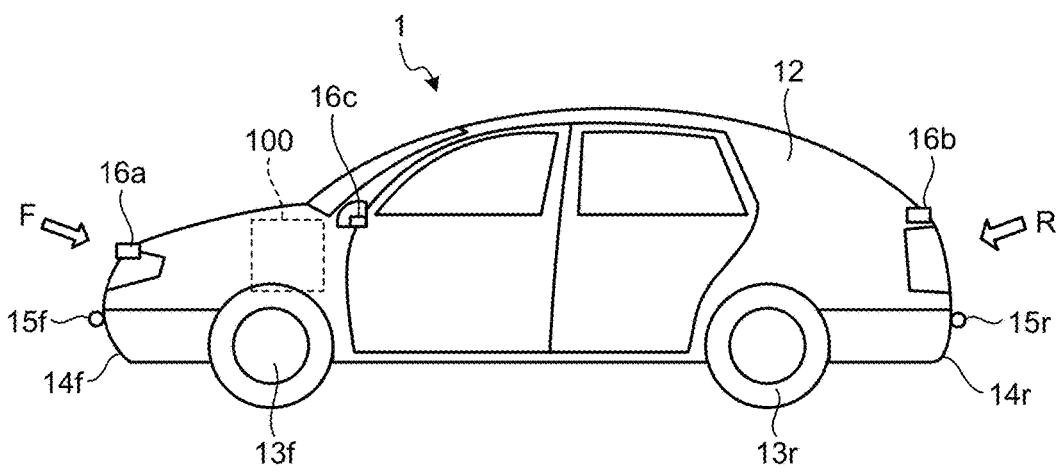
FIG. 2 is a diagram illustrating an example of a vehicle including an in-vehicle device according to the first embodiment.

FIG. 2 is a diagram illustrating an example of the vehicle 1 including an in-vehicle device 100 according to the first embodiment. As illustrated in FIG. 2, the vehicle 1 includes a vehicle body 12 and two pairs of wheels 13 disposed in a predetermined direction in the vehicle body 12. The two pairs of wheels 13 include a pair of front tires 13f and a pair of rear tires 13r.

Although the vehicle 1 illustrated in FIG. 2 includes four wheels 13, the number of wheels 13 is not limited thereto. For example, the vehicle 1 may be a motorcycle.

The vehicle body 12 is coupled to the wheels 13 and is movable by the wheels 13. In this case, the predetermined direction in which the two pairs of wheels 13 are disposed is a traveling direction of the vehicle 1. The vehicle 1 can move forward or backward by switching not-illustrated gears or the like. The vehicle 1 can also turn to the right and the left according to steering.

The vehicle body 12 has a front end portion F, which is an end portion on the front tire 13f side, and a rear end portion R, which is an end portion on the rear tire 13r side. The vehicle body 12 has a substantially rectangular shape in top view. Four corners of the substantially rectangular shape are sometimes referred to as end portions. Although not illustrated in FIG. 2, the vehicle 1 includes a display device, a speaker, and an operation unit.

A pair of bumpers 14 is provided at the front and rear end portions F and R of the vehicle body 12 and near the lower end of the vehicle body 12. Of the pair of bumpers 14, a front bumper 14f covers an entire front surface and a part of a side surface near the lower end portion of the vehicle body 12. Of the pair of bumpers 14, a rear bumper 14r covers an entire rear surface and a part of a side surface near the lower end portion of the vehicle body 12.

Wave transmitting and receiving units 15f and 15r that transmit and receive sound waves such as ultrasonic waves are disposed at a predetermined end of the vehicle body 12. For example, one or more wave transmitting and receiving units 15f are disposed in the front bumper 14f and one or more wave transmitting and receiving units 15r are disposed in the rear bumper 14r. In the following explanation, when not being particularly limited, the wave transmitting and receiving units 15f and 15r are simply referred to as wave transmitting and receiving units 15. The number and positions of the wave transmitting and receiving units 15 are not limited to the example illustrated in FIG. 2. For example, the vehicle 1 may include the wave transmitting and receiving units 15 on the left and right sides.

In the present embodiment, sonars using ultrasonic waves are an example of the wave transmitting and receiving units 15. However, the wave transmitting and receiving units 15 may be radars that transmit and receive electromagnetic waves. Alternatively, the vehicle 1 may include both of the sonars and the radars. The wave transmitting and receiving units 15 may be simply referred to as sensors.

The wave transmitting and receiving units 15 detect an obstacle around the vehicle 1 based on a result of transmission and reception of a sound wave or an electromagnetic wave. The wave transmitting and receiving units 15 measure the distance between the obstacle around the vehicle 1 and the vehicle 1 based on the result of transmission and reception of the sound wave or the electromagnetic wave.

The vehicle 1 includes a first in-vehicle camera 16a that images the front of the vehicle 1, a second in-vehicle camera 16b that images the rear of the vehicle 1, a third in-vehicle camera 16c that images the left side of the vehicle 1, and a fourth in-vehicle camera that images the right side of the vehicle 1. The fourth in-vehicle camera is not illustrated.

In the following explanation, when not being particularly distinguished, the first in-vehicle camera 16a, the second in-vehicle camera 16b, the third in-vehicle camera 16c, and the fourth in-vehicle camera are simply referred to as in-vehicle cameras 16. The positions and the number of the in-vehicle cameras are not limited to the example illustrated in FIG. 2. For example, the vehicle 1 may include two in-vehicle cameras, i.e., the first in-vehicle camera 16a and the second in-vehicle camera 16b. Alternatively, the vehicle 1 may further include another in-vehicle camera besides the example explained above.

The in-vehicle cameras 16 are capable of capturing videos around the vehicle 1, and are, for example, cameras that capture color images. Image data captured by the in-vehicle cameras 16 may be a moving image or a still image. The in-vehicle cameras 16 may be cameras built on the vehicle 1, cameras of a drive recorder retrofitted to the vehicle 1, or the like.

The in-vehicle device 100 is mounted on the vehicle 1. The in-vehicle device 100 is an information processing device that can be mounted on the vehicle 1, and is, for example, an ECU (Electronic Control Unit) or an OBU (On Board Unit) provided inside the vehicle 1. Alternatively, the in-vehicle device 100 may be an external device installed near a dashboard of the vehicle 1. Note that the in-vehicle device 100 may also serve as a car navigation device or the like.

Figure 3:
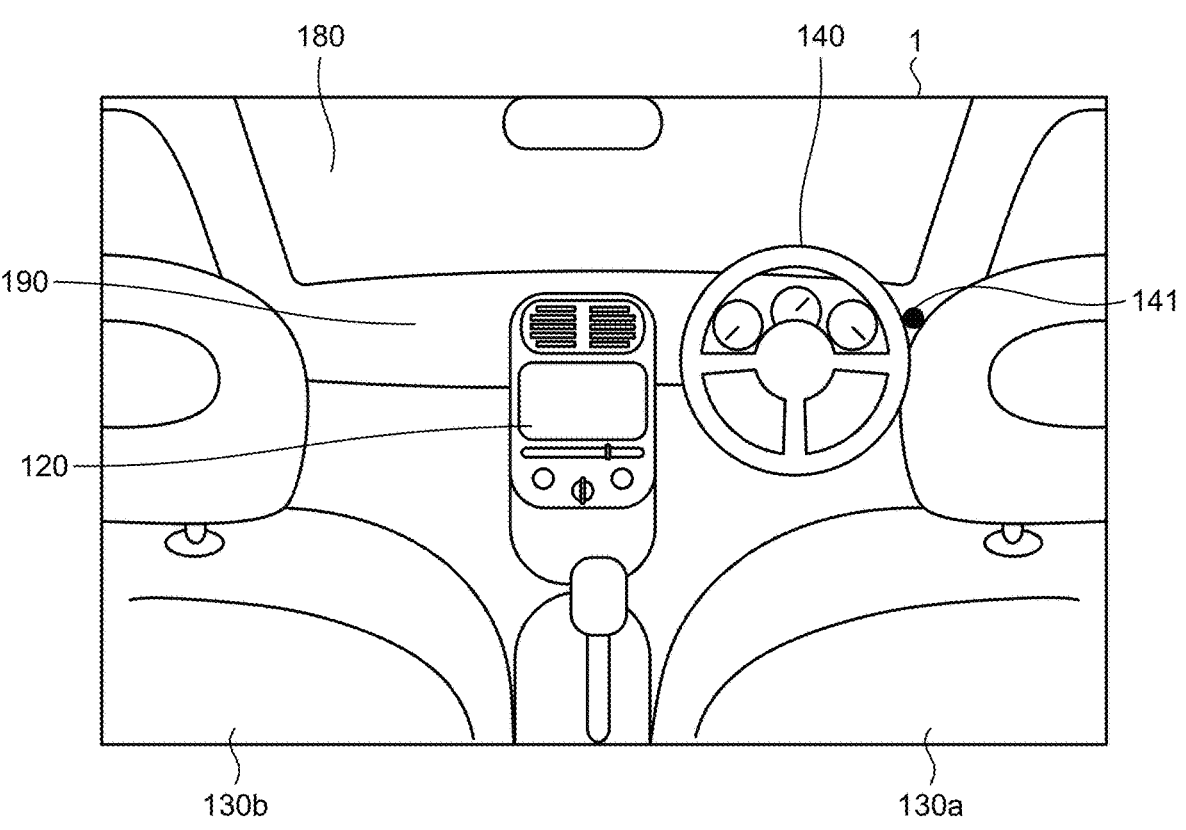
FIG. 3 is a diagram illustrating an example of a configuration in the vicinity of a driver's seat of the vehicle according to the first embodiment.

Next, a configuration in the vicinity of the driver's seat of the vehicle 1 in the present embodiment is explained. FIG. 3 is a diagram illustrating an example of a configuration in the vicinity of a driver's seat 130a of the vehicle 1 according to the first embodiment.

As illustrated in FIG. 3, the vehicle 1 includes the driver's seat 130a and a passenger seat 130b. A windshield 180, a dashboard 190, a steering wheel 140, a display device 120, and an operation button 141 are provided in front of the driver's seat 130a.

The display device 120 is a display provided on the dashboard 190 of the vehicle 1. As an example, the display device 120 is located in the center of the dashboard 190 as illustrated in FIG. 3. The display device 120 is, for example, a liquid crystal display or an EL (Electro Luminescence) display. The display device 120 may also serve as a touch panel. The display device 120 is an example of a display unit in the present embodiment.

The steering wheel 140 is provided in front of the driver's seat 130a and can be operated by a driver. A rotation angle of the steering wheel 140, in other words, a steering angle is electrically or mechanically interlocked with a change in the direction of the front tires 13f, which are steering wheels. Note that the steering wheels may be the rear tires 13r or may be both of the front tires 13f and the rear tires 13r.

The operation button 141 is a button capable of receiving operation by a user. Note that, in the present embodiment, the user is, for example, the driver of the vehicle 1. Note that the position of the operation button 141 is not limited to the example illustrated in FIG. 3 and may be provided, for example, on the steering wheel 140. The operation button 141 is an example of an operation unit in the present embodiment. When the display device 120 also serves as a touch panel, the display device 120 may be an example of the operation unit. An operation terminal capable of transmitting a signal from the outside of the vehicle 1 such as a tablet terminal, a smartphone, a remote controller, or an electronic key, which is not illustrate, to the vehicle 1 may be an example of the operation unit.

Next, a hardware configuration of the in-vehicle device 100 in the present embodiment is explained.

Figure 4:
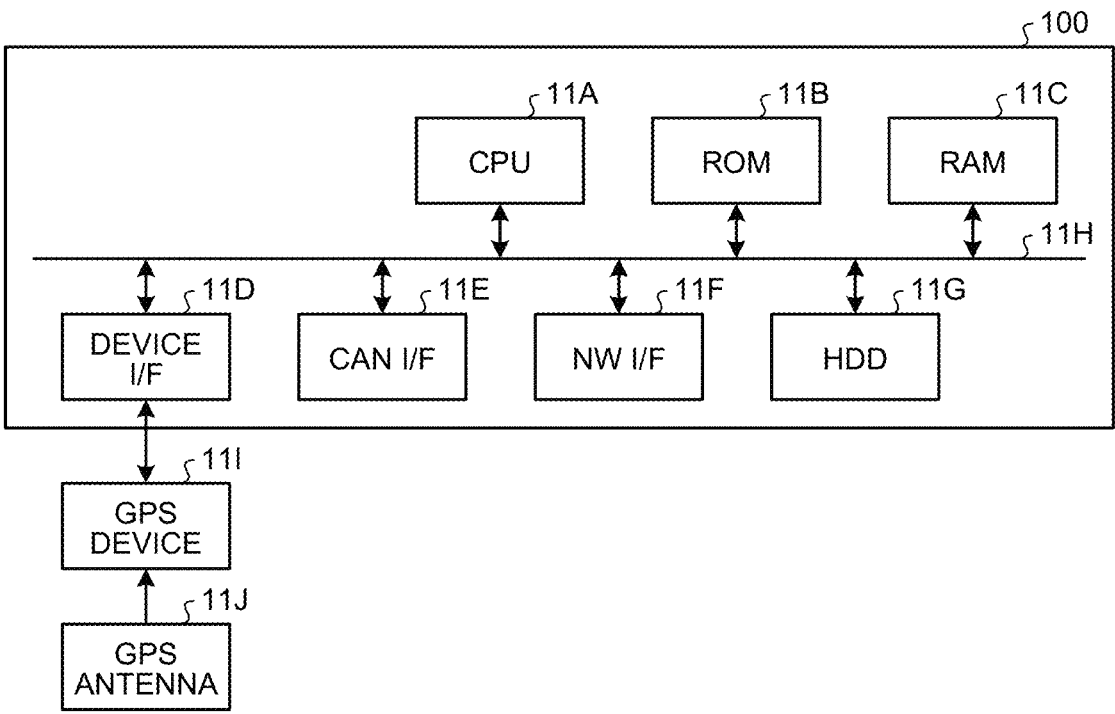
FIG. 4 is a diagram illustrating an example of a hardware configuration of the in-vehicle device according to the first embodiment.

FIG. 4 is a diagram illustrating an example of a hardware configuration of the in-vehicle device 100 according to the first embodiment. As illustrated in FIG. 4, the in-vehicle device 100 has a hardware configuration in which a CPU (Central Processing Unit) 11A, a ROM 11B, a RAM 11C, a device I/F (interface) 11D, a CAN (Controller Area Network) I/F 11E, a NW (NetWork) I/F 11F, a HDD 11G, and the like are mutually connected by a bus 11H and a normal computer is used.

The CPU 11A is an arithmetic device that controls the entire in-vehicle device 100. Note that the CPU 11A is an example of a processor in the in-vehicle device 100 in the present embodiment and another processor or a processing circuit may be provided instead of the CPU 11A.

The ROM 11B, the RAM 11C, and the HDD 11G function as storage units. For example, the ROM 11B stores a program or the like that implements various kinds of processing by the CPU 11A. The RAM 11C is, for example, a main storage device of the in-vehicle device 100 and stores data necessary for the various kinds of processing by the CPU 11A.

The device I/F 11D is an interface connectable to various devices. For example, the device I/F 11D is connected to a GPS device 11*l* and acquires position information indicating the current position of the vehicle 1 from the GPS device 11*l*. The position information is, for example, values of latitude and longitude indicating the absolute position of the vehicle 1.

The GPS device 11*l* is a device that specifies GPS coordinates representing the position of the vehicle 1 based on a GPS signal received by a GPS antenna 11J. The GPS antenna 11J is an antenna capable of receiving a GPS signal.

The device I/F 11D acquires images, detection results, and the like from in-vehicle cameras 16 and the wave transmitting and receiving units 15.

The CAN I/F 11E is an interface for transmitting and receiving information to and from another ECU mounted on the vehicle 1 via a CAN in the vehicle 1. Note that a communication standard other than the CAN may be adopted.

The NW I/F 11F is a communication device capable of communicating with an external information processing device such as the cloud server 2 via a network such as the Internet. The NW I/F 11F can perform communication by, for example, a public line such as LTE (Long Term Evolution) (registered trademark) or near field communication such as Wi-Fi (registered trademark) or Bluetooth (registered trademark). In addition, the NW I/F 11F of the in-vehicle device 100 may directly communicate with the cloud server 2 via the Internet or may indirectly communicate with the cloud server 2 via equipment such as another information processing device.

Next, functions of the in-vehicle device 100 in the present embodiment is explained.

Figure 5:
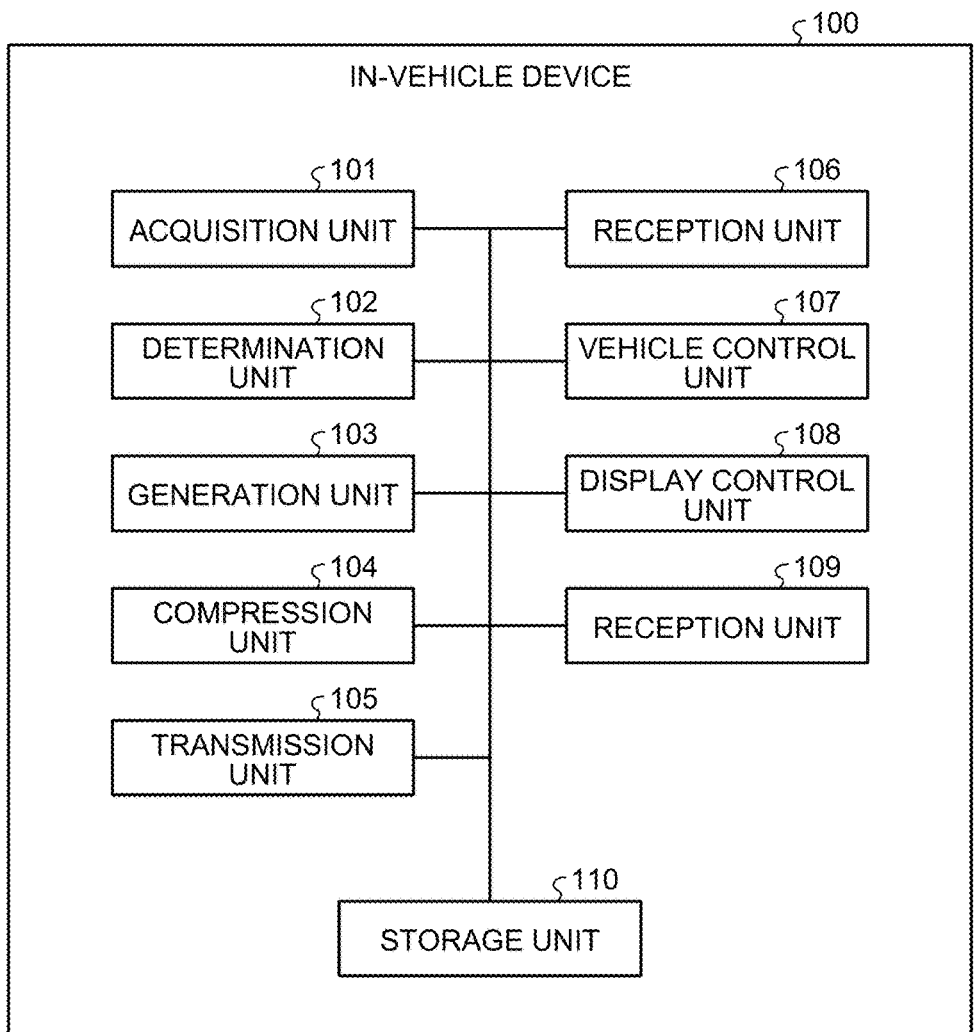
FIG. 5 is a block diagram illustrating an example of functions of the in-vehicle device according to the first embodiment.

FIG. 5 is a block diagram illustrating an example of the functions of the in-vehicle device 100 according to the first embodiment. As illustrated in FIG. 5, the in-vehicle device 100 includes an acquisition unit 101, a determination unit 102, a generation unit 103, a compression unit 104, a transmission unit 105, a reception unit 106, a vehicle control unit 107, a display control unit 108, a reception unit 109, and a storage unit 110.

The storage unit 110 is configured by, for example, the ROM 11B, the RAM 11C, or the HDD 11G. Note that, in FIG. 5, one storage unit 110 is illustrated as being included in the in-vehicle device 100. However, a plurality of storage media may function as the storage unit 110.

The acquisition unit 101, the determination unit 102, the generation unit 103, the compression unit 104, the transmission unit 105, the reception unit 106, the vehicle control unit 107, the display control unit 108, and the reception unit 109 are functions executed by, for example, the CPU 11A reading a program stored in the ROM 11B or the HDD 11G. Alternatively, a hardware circuit including these functions may be provided in the in-vehicle device 100.

The acquisition unit 101 acquires vehicle state information indicating a state of the vehicle 1 and sensor data measured by sensors provided on the vehicle 1.

In the present embodiment, the sensors provided on the vehicle 1 are, for example, the in-vehicle cameras 16 or the wave transmitting and receiving units 15. More specifically, in the present embodiment, an example in which the in-vehicle cameras 16 are the sensors is explained. In the present embodiment, image data captured by the in-vehicle cameras 16 is explained as an example of sensor data.

The acquisition unit 101 acquires image data obtained by imaging the surroundings of the vehicle 1 from the in-vehicle cameras 16 via the device I/F 11D. The acquisition unit 101 acquires distance measurement data of the distance between an obstacle around the vehicle 1 and the vehicle 1 and a detection result of the obstacle from the wave transmitting and receiving units 15 via the device I/F 11D.

Note that the sensors may be both in-vehicle cameras 16 and the wave transmitting and receiving units 15 or the wave transmitting and receiving units 15. The vehicle 1 may further include other sensors. When the sensors are the wave transmitting and receiving units 15, the sensor data may be distance measurement data of the distance between an obstacle around the vehicle 1 and the vehicle 1 or detection results of the obstacle by the wave transmitting and receiving units 15.

The vehicle state information in the present embodiment includes at least vehicle speed of the vehicle 1. The acquisition unit 101 acquires the vehicle speed of the vehicle 1 from other ECUs via the CAN I/F 11E. The acquisition unit 101 may acquire wheel speed of the vehicle 1 from a wheel speed sensor or the like provided on the vehicle 1 and obtain vehicle speed of the vehicle 1 from the wheel speed.

The vehicle state information may include information other than the vehicle speed. For example, at least one of vehicle speed, GPS position information of the vehicle 1 measured by the GPS device 11*l*, a state of the gears of the vehicle 1, a steering angle, peripheral information such as illuminance around the vehicle 1, weather information around the vehicle 1, and an operation state of wipers of the vehicle 1 may be included in the vehicle state information. These kinds of information are acquired from the devices of the vehicle 1 by the acquisition unit 101. The GPS position information is used to specify characteristics of the current position of the vehicle 1. For example, the acquisition unit 101 may obtain the characteristics of the current position of the vehicle 1 from map data and the GPS position information of the vehicle 1. The map data may be stored in, for example, an external device connected to the in-vehicle device 100 via the Internet or the like or may be stored in the storage unit 110 of the in-vehicle device 100. The characteristics of the current position of the vehicle 1 are, for example, classifications such as a parking lot, a general road, and a freeway.

The determination unit 102 determines a compression rate of sensor data according to the vehicle state information. For example, when the vehicle speed included in the vehicle state information is equal to or lower than a first threshold, the determination unit 102 determines to compress the sensor data at a low compression rate. When the vehicle speed included in the vehicle state information is higher than the first threshold, the determination unit 102 determines to compress the sensor data at a high compression rate. The low compression rate is an example of a first compression rate in this application. The high compression rate is an example of a second compression rate in the present application. Specific numerical values of the low compression rate and the high compression rate are not particularly limited, and it is enough that the high compression rate is higher than the low compression rate. A value of the first threshold is not particularly limited.

In the present embodiment, the compression rate is divided into two stages of the low compression rate and the high compression rate. However, the compression rate may be divided into three or more stages. For example, the determination unit 102 may determine the compression rate in stages such that the compression rate is higher as the vehicle speed is higher.

When the vehicle speed is high, the in-vehicle device 100 desirably quickly obtains a result of the ADAS processing from the cloud server 2 in order for driving control of the vehicle 1. As the compression rate of the sensor data is higher, a transmission time of the compressed sensor data between the vehicle 1 and the cloud server 2 is shorter. Therefore, the determination unit 102 sets the compression rate of the sensor data higher when the vehicle speed is high than when the vehicle speed is low and quickly transmits the sensor data after the compression to the cloud server 2.

Note that the compression system in the present embodiment is not particularly limited but is basically irreversible compression. Therefore, the compressed sensor data transmitted from the vehicle 1 to the cloud server 2 has a smaller data size than a state before the compression even after being decompressed by the cloud server 2. When the cloud server 2 executes pedestrian detection processing based on image data transmitted from the vehicle 1, as a size of the image data is larger, more highly accurate pedestrian detection is possible. For example, when the vehicle 1 is traveling at low speed, it is assumed that the vehicle 1 is in a state just before parking or is traveling on a narrow road. In such a case, there is a high possibility of, for example, a pedestrian rushing out. Therefore, the cloud server 2 executes pedestrian detection with high accuracy using high-resolution image data.

The determination unit 102 may determine the compression rate of the sensor data according to the vehicle state information other than the vehicle speed. For example, when the wipers of the vehicle 1 are continuously operating, raining is highly likely. When the weather is rain, the visibility of the periphery of the vehicle 1 by the driver decreases. In such a case, in order to improve the accuracy of pedestrian detection by the cloud server 2, the determination unit 102 determines the compression rate of the image data to be the low compression rate. When the current position of the vehicle 1 is a parking lot, the determination unit 102 may determine the compression rate of the image data to be the low compression rate in order to improve the accuracy of detection of a pedestrian and other surrounding vehicles by the cloud server 2.

The determination unit 102 may determine the compression rate of the sensor data according to a combination of a plurality of kinds of information, for example, a combination of the vehicle speed and the characteristics of the current position of the vehicle 1.

Besides the compression rate, the determination unit 102 may determine various characteristics of the sensor data according to the vehicle state information. For example, when the image data is a moving image and the vehicle speed is equal to or lower than the first threshold, the determination unit 102 determines that the frame rate of the image data to be a low frame rate and determine the resolution of the image data to be a high resolution. When the vehicle speed is higher than the first threshold, the determination unit 102 determines the frame rate of the image data to be a high frame rate and the resolution of the image data to be a low resolution.

The low frame rate is an example of a first frame rate in the present embodiment. In addition, the high frame rate is an example of the first frame rate in the present embodiment. Specific values of the low frame rate and the high frame rate are not particularly limited, and it is enough that the high frame rate is higher than the low frame rate. The high resolution is an example of a first resolution in the present embodiment. The low resolution is an example of a second resolution in the present embodiment. Specific values of the high resolution and the low resolution are not particularly limited, and it is enough that the high resolution is higher than the low resolution. Note that the resolution determined by the determination unit 102 is a resolution in a state in which the image data is decompressed in the cloud server 2 after being compressed. Note that, when the image data is a still image, the determination unit 102 does not determine the frame rate but determines the resolution.

In the present embodiment, the frame rate and the resolution are in two stages. However, the frame rate and the resolution may be divided into three or more stages. For example, the determination unit 102 may determine the frame rate in stages such that the frame rate is higher as the vehicle speed is higher. In addition, the determination unit 102 may determine the resolution in stages such that the resolution is higher as the vehicle speed is lower. In general, movement in the image data is larger as the vehicle speed of the vehicle 1 is higher. The determination unit 102 sets the frame rate high, whereby it is possible to reduce omission of detection of the movement in the image data in the cloud server 2.

The generation unit 103 generates header-added sensor data obtained by adding the compression rate determined by the determination unit 102 to the sensor data. The header-added sensor data is an example of compression-rate-added sensor data in the present embodiment.

In addition, when the determination unit 102 determines the frame rate and the resolution of image data according to the vehicle state information, the generation unit 103 edits the image data to the frame rate determined by the determination unit 102. After compressing and decompressing the image data, the generation unit 103 may adjust the resolution of the image data to be the resolution determined by the determination unit 102.

Figure 6:
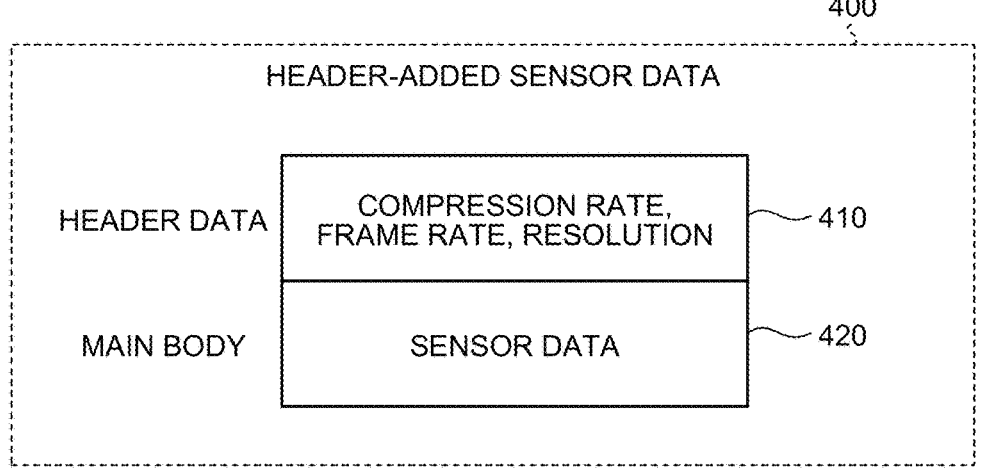
FIG. 6 is a diagram illustrating an example of header-added sensor data according to the first embodiment.

FIG. 6 is a diagram illustrating an example of header-added sensor data 400 according to the first embodiment. As illustrated in FIG. 6, the header-added sensor data 400 is data to which a compression rate is given as header data 410 accompanying sensor data 420, which is a main body.

Note that the header-added sensor data 400 may include data other than the compression rate in the header data 410. In the example illustrated in FIG. 6, the header data 410 includes the compression rate of the image data, the frame rate of the image data, and the resolution of the image data. The compression rate of the image data, the frame rate of the image data, and the resolution of the image data are examples of metadata of the image data. When the sensor data is not image data, content of the metadata is sometimes different from that in the example illustrated in FIG. 6.

Note that, in the header-added sensor data 400 illustrated in FIG. 6, the metadata such as the compression rate is included in the header data 410 of the sensor data 420, which is the image data. However, it is enough that the metadata such as the compression rate is associated with the sensor data 420 and the metadata may not necessarily be added to the sensor data 420 as the header data 410.

Referring back to FIG. 5, the compression unit 104 compresses the sensor data at a compression rate varying depending on the vehicle state information. More specifically, the compression unit 104 compresses the header-added sensor data 400 generated by the generation unit 103 at the compression rate determined by the determination unit 102.

The transmission unit 105 transmits the compression rate to the cloud server 2 via the NW I/F 11F in association with the compressed sensor data 420. More specifically, the transmission unit 105 transmits the header-added sensor data 400 compressed by the compression unit 104 to the cloud server 2.

The reception unit 106 receives vehicle control data for controlling traveling of the vehicle 1 from the cloud server 2 via the NW I/F 11F. The vehicle control data is, for example, a processing result by the ADAS. Specifically, the vehicle control data is a detection result of an obstacle around the vehicle 1, a signal for instructing braking operation for the vehicle 1, a signal for instructing steering of the vehicle 1, a signal for instructing vehicle speed of the vehicle 1, or the like.

The vehicle control unit 107 controls traveling of the vehicle 1 based on the vehicle control data received by the reception unit 106. For example, the vehicle control unit 107 controls steering, braking, and acceleration/deceleration of the vehicle 1 based on the vehicle control data. Besides the control based on the vehicle control data, the vehicle control unit 107 may control the traveling of the vehicle 1 based on an image of the surroundings of the vehicle 1 captured by the in-vehicle camera 16 and a distance to an obstacle around the vehicle 1 detected by the wave transmitting and receiving unit 15.

The display control unit 108 causes the display device 120 to display various images and a GUI (Graphical User Interface). The display control unit 108 may cause, based on the vehicle control data received by the reception unit 106, the display device 120 to display a warning of obstacle detection.

The reception unit 109 receives various kinds of operation from the driver of the vehicle 1 via the operation button 141. When the display device 120 includes a touch panel, the reception unit 109 receives various kinds of operation input to the touch panel from the driver of the vehicle 1.

Next, functions of the cloud server 2 are explained.

Figure 7:
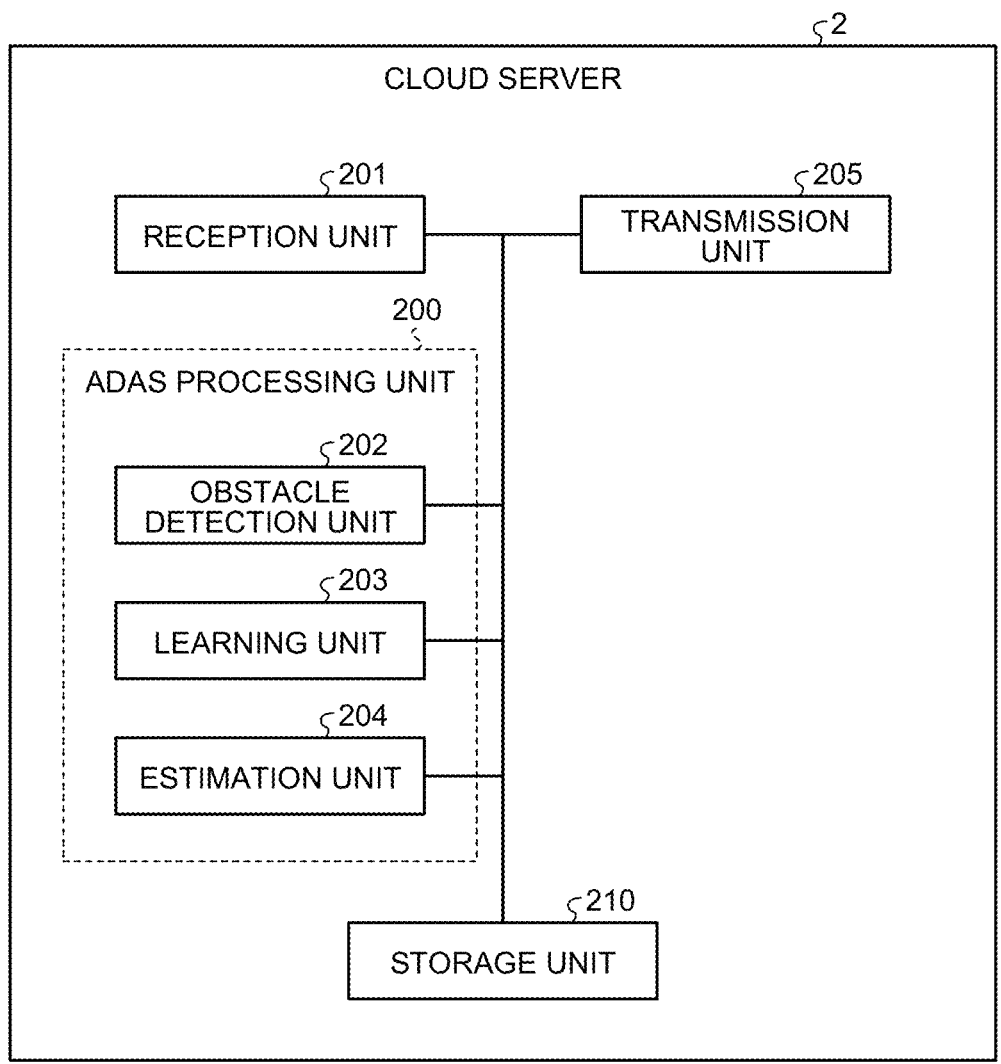
FIG. 7 is a block diagram illustrating an example of functions of the cloud server according to the first embodiment.

FIG. 7 is a block diagram illustrating an example of the functions of the cloud server 2 according to the first embodiment.

As illustrated in FIG. 7, the cloud server 2 includes a reception unit 201, an ADAS processing unit 200, a transmission unit 205, and a storage unit 210. The ADAS processing unit 200 is an example of a control processing unit in the present embodiment.

The storage unit 210 is configured by, for example, a ROM, a RAM, or an HDD in a cloud environment.

The reception unit 201, the ADAS processing unit 200, and the transmission unit 205 are functions executed by, for example, a CPU in the cloud environment reading a program stored in the storage unit 210.

The reception unit 201 receives the compressed sensor data 420 and the compression rate of the sensor data 420 from the in-vehicle device 100 mounted on the vehicle 1. More specifically, the reception unit 201 receives the compressed header-added sensor data 400 from the in-vehicle device 100 mounted on the vehicle 1.

The ADAS processing unit 200 executes processing varying depending on the compression rate of the sensor data 420. More specifically, the ADAS processing unit 200 executes processing varying depending on the compression rate included in the compressed header-added sensor data 400.

In the example illustrated in FIG. 7, the ADAS processing unit 200 includes an obstacle detection unit 202, a learning unit 203, and an estimation unit 204. These functional units are an example of ADAS functions executed by the ADAS processing unit 200. Note that functional units included in the ADAS processing unit 200 are not limited thereto.

The obstacle detection unit 202 changes, according to the compression rate of the sensor data 420, a threshold for obstacle detection in processing for detecting an obstacle from the sensor data 420. The threshold for obstacle detection is hereinafter referred to as detection threshold. Note that the obstacle detection unit 202 decompresses the compressed sensor data 420 and then uses the decompressed sensor data 420 for obstacle detection.

For example, when the compression rate of the sensor data 420 is equal to or lower than a second threshold, the obstacle detection unit 202 executes obstacle detection based on the sensor data 420 using a low compression rate detection threshold. When the compression rate of the sensor data 420 is higher than the second threshold, the obstacle detection unit 202 executes obstacle detection based on the sensor data 420 using a high compression rate detection threshold.

The low compression rate detection threshold is an example of a first detection threshold in the present embodiment. The high compression rate detection threshold is an example of a second detection threshold in the present embodiment. The high compression rate detection threshold is a value lower than the low compression rate detection threshold. In other words, when the compression rate of the sensor data 420 is high, the obstacle detection unit 202 more easily determines that "an obstacle is present around the vehicle 1" than when the compression rate of the sensor data 420 is low. When the sensor data 420 is image data, image data with a high compression rate has a lower resolution than image data with a low compression rate. Therefore, when the image data with the high compression rate is used, the obstacle detection unit 202 sets the detection threshold for obstacle detection lower and reduces detection omission of an obstacle. Note that a level of the detection threshold may be divided into two or more stages.

The obstacle detection unit 202 may generate a signal for instructing braking operation for the vehicle 1 for avoiding a detected obstacle, a signal for instructing steering of the vehicle 1, a signal for instructing vehicle speed of the vehicle 1, or the like.

The learning unit 203 learns sensor data transmitted from the in-vehicle device 100. A method of the learning is, for example, deep learning using a learning model but is not limited thereto. Note that the learning unit 203 decompresses the compressed sensor data 420 and then uses the decompressed sensor data 420 for learning.

The learning unit 203 uses a different learning model according to the compression rate of the sensor data 420. For example, when the compression rate of the sensor data 420 is equal to or lower than the second threshold, the learning unit 203 causes a low compression rate learning model to learn the sensor data 420. When the compression rate of the sensor data 420 is higher than the second threshold, the learning unit 203 causes a high compression rate learning model to learn the sensor data 420. The low compression rate learning model is an example of a first learning model in the present embodiment. The high compression rate learning model is an example of a second learning model in the present embodiment. The learning unit 203 stores the low compression rate learning model and the high compression rate learning model in, for example, the storage unit 210.

Since conditions of the learning data input to the learning model are unified, learning accuracy of the learning model is improved. As explained above, when the sensor data 420 is image data, image data having a high compression rate has a lower resolution than image data having a low compression rate. Therefore, the learning unit 203 uses a different learning model according to the compression rate of the sensor data 420, whereby the learning accuracy of the learning model is further improved than when the learning unit 203 inputs a plurality of pieces of sensor data 420 having different compression rates to one learning model. Note that the number of learning models is not limited to two and may be three or more.

The estimation unit 204 executes estimation processing using the low compression rate learning model and the high compression rate learning model learned by the learning unit 203. Content of the estimation processing may be, for example, obstacle detection or forward collision warning.

For example, when the compression rate of the sensor data 420 is equal to or lower than the second threshold, the estimation unit 204 inputs the sensor data 420 to the learned low compression rate learning model and obtains an output from the learned low compression rate learning model as an estimation result. When the compression rate of the sensor data 420 is higher than the second threshold, the estimation unit 204 inputs the sensor data 420 to the learned high compression rate learning model and obtains an output from the learned high compression rate learning model as an estimation result.

Note that the learning unit 203 and the estimation unit 204 may not function simultaneously. For example, the estimation unit 204 may not function until the sensor data 420 equal to or more than a specified threshold is learned in the low compression rate learning model and the high compression rate learning model. Although the obstacle detection unit 202 and the estimation unit 204 are illustrated as separate functional units in FIG. 7, the obstacle detection unit 202 may execute the obstacle detection using the low compression rate learning model and the high compression rate learning model learned by the learning unit 203.

Note that a change of processing corresponding to the compression rate of the sensor data 420 is not limited to the example explained above. The ADAS processing unit 200 may change the processing algorithm according to the compression rate of the sensor data 420. The ADAS processing unit 200 may execute different processing according to metadata other than the compression rate. For example, the ADAS processing unit 200 may change a detection threshold, a learning model, or an algorithm used for the processing according to the frame rate or the resolution included in the header data 410 of the header-added sensor data 400.

The transmission unit 205 transmits vehicle control data, which is a result of the processing by the ADAS processing unit 200, to the in-vehicle device 100. For example, the transmission unit 205 transmits the detection result of the obstacle by the obstacle detection unit 202 to the in-vehicle device 100. The transmission unit 205 may transmit, to the in-vehicle device 100, a signal for instructing braking operation for the vehicle 1, a signal for instructing steering of the vehicle 1, or a signal for instructing a vehicle speed of the vehicle 1, the signal being generated by the obstacle detection unit 202.

Next, a flow of transmission processing for the sensor data 420 executed by the in-vehicle device 100 configured as explained above is explained.

Figure 8:
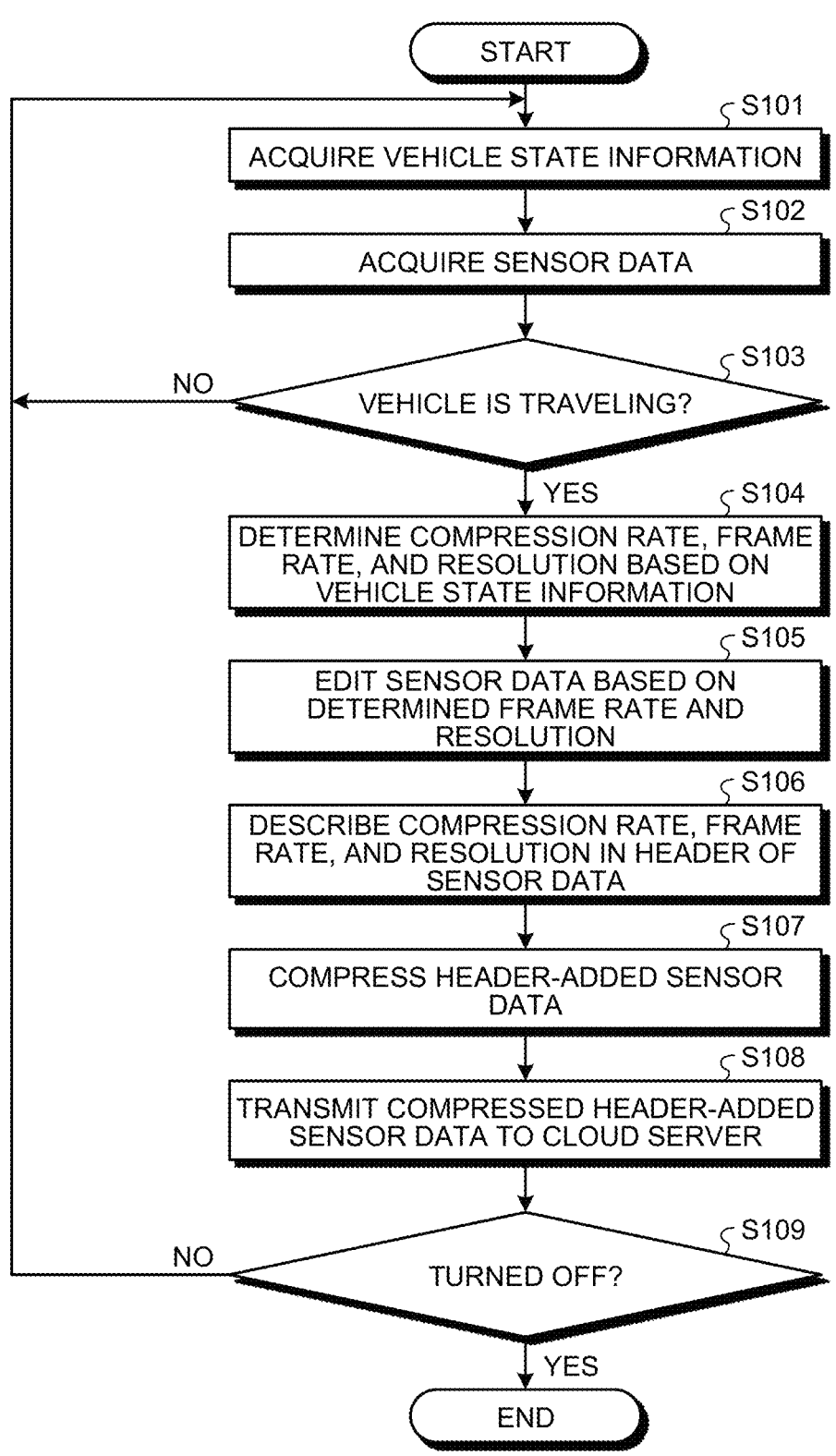
FIG. 8 is a flowchart illustrating an example of a flow of sensor data transmission processing according to the first embodiment.

FIG. 8 is a flowchart illustrating an example of a flow of the transmission processing for the sensor data 420 according to the first embodiment. For example, when the in-vehicle device 100 receives power supply from an ignition power supply of the vehicle 1, the processing of this flowchart starts when the ignition power supply is in an on state. When the in-vehicle device 100 receives power supply from an accessory power supply of the vehicle 1, the processing of this flowchart starts when the accessory power supply is in the on state.

First, the acquisition unit 101 acquires vehicle state information such as vehicle speed of the vehicle 1 (S101). The acquisition unit 101 acquires the sensor data 420 (S102).

Next, the determination unit 102 determines whether the vehicle 1 is traveling (S103). For example, when the vehicle speed of the vehicle 1 acquired by the acquisition unit 101 is equal to or higher than a threshold, the determination unit 102 determines that the vehicle 1 is traveling. Note that the determination unit 102 may determine presence or absence of traveling of the vehicle 1 based on, for example, an operation state of an accelerator pedal.

When the determination unit 102 determines that the vehicle 1 is not traveling (S103 "No"), the processing returns to S101. When the vehicle 1 does not start traveling, the processing in S101 to S103 is repeatedly executed. When the vehicle 1 is not traveling, the acquisition unit 101 may not acquire the sensor data 420.

When determining that the vehicle 1 is traveling (S103 "Yes"), the determination unit 102 determines a compression rate, a frame rate, and a resolution of the sensor data 420 according to the vehicle state information (S104).

Subsequently, the generation unit 103 edits the sensor data 420 according to the frame rate and the resolution determined by the determination unit 102 (S105).

Subsequently, the generation unit 103 describes the compression rate, the frame rate, and the resolution determined by the determination unit 102 in a header of the sensor data 420 (S106).

Next, the compression unit 104 compresses the header-added sensor data 400 at the compression rate determined by the determination unit 102 (S107).

Next, the transmission unit 105 transmits the compressed header-added sensor data 400 to the cloud server 2 (S108).

When the ignition power supply or the accessory power supply of the vehicle 1 is in the on state (S109 "No"), the processing returns to S101 and the processing of this flow-chart is repeated. When the ignition power supply or the accessory power supply of the vehicle 1 is turned off (S109 "Yes"), the processing of this flowchart ends.

Next, a flow of ADAS processing executed by the cloud server 2 is explained.

Figure 9:
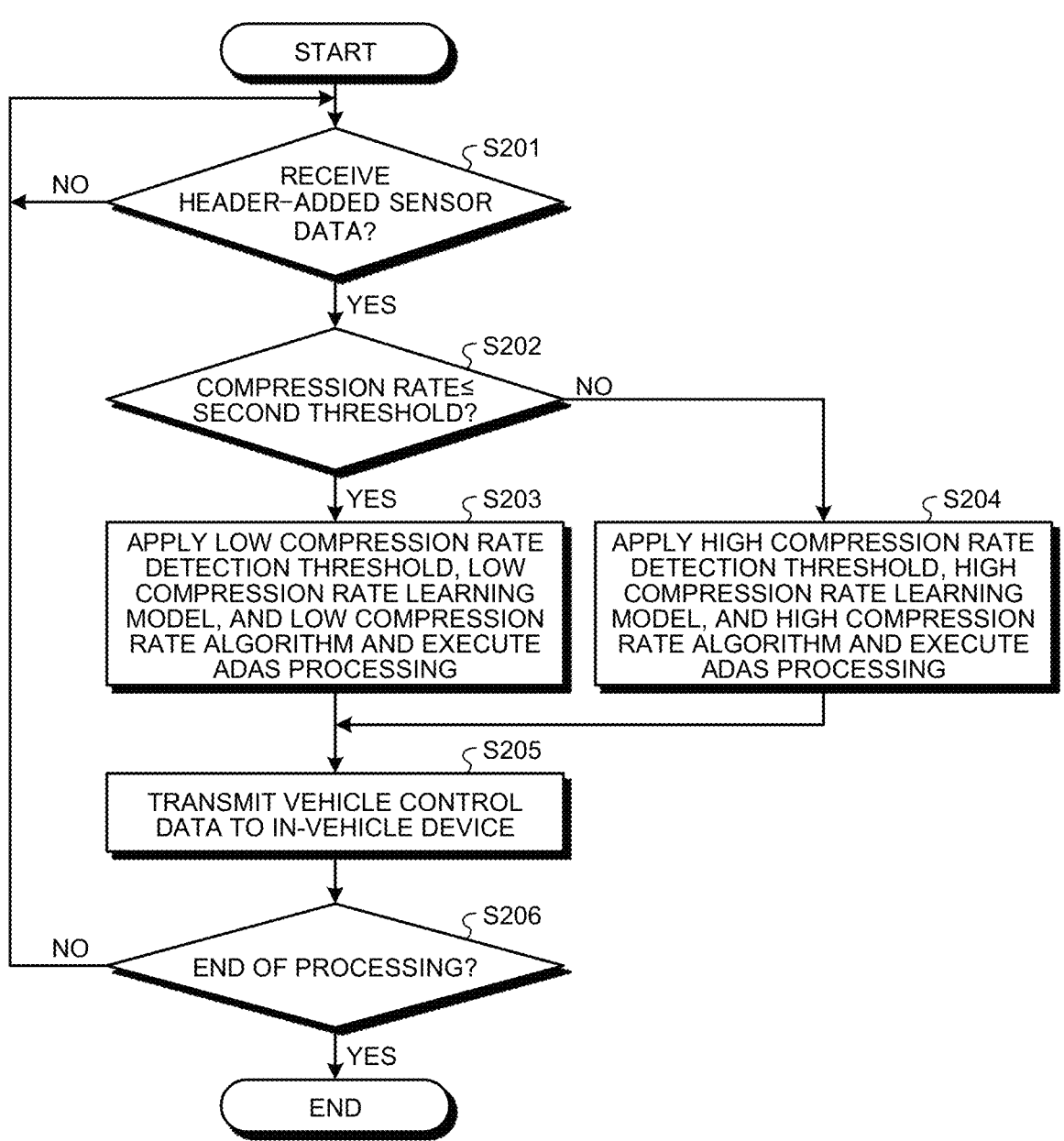
FIG. 9 is a flowchart illustrating an example of a flow of ADAS processing executed by the cloud server according to the first embodiment.

FIG. 9 is a flowchart illustrating an example of a flow of ADAS processing executed by the cloud server 2 according to the first embodiment. The ADAS processing by the cloud server 2 is basically always in a start possible state and is on standby for reception of the header-added sensor data 400 from the in-vehicle device 100.

When the reception unit 201 of the cloud server 2 receives the header-added sensor data 400 from the in-vehicle device 100 mounted on the vehicle 1 (S201 "Yes") and the com-pression rate is the second threshold or lower (S202 "Yes"), the obstacle detection unit 202, the learning unit 203, and the estimation unit 204 included in the ADAS processing unit 200 of the cloud server 2 execute various kinds of ADAS processing by applying the low compression rate detection threshold, the low compression rate learning model, and a low compression rate algorithm (S203).

When the reception unit 201 receives the header-added sensor data 400 from the in-vehicle device 100 mounted on the vehicle 1 (S201 "Yes") and the compression rate is higher than the second threshold (S202 "No"), the obstacle detection unit 202, the learning unit 203, and the estimation unit 204 included in the ADAS processing unit 200 of the cloud server 2 execute the ADAS processing by applying the high compression rate detection threshold, the high com-pression rate learning model, and a high compression rate algorithm (S204).

After the processing in S203 and S204, the transmission unit 205 of the cloud server 2 transmits vehicle control data, which is a result of the processing by the ADAS processing unit 200, to the in-vehicle device 100 (S205).

Then, when the ADAS processing is continued without ending (S206 "No"), the processing returns to S201 and the processing of this flowchart is repeated. When the ADAS processing ends (S206 "Yes"), the processing of this flow-chart ends. The ADAS processing by the cloud server 2 ends, for example, when the cloud server 2 is stopped by an administrator.

As explained above, the in-vehicle device 100 in the present embodiment compresses the sensor data 420 at a compression rate varying depending on the vehicle state information of the vehicle 1 and transmits the compression rate in association with the compressed sensor data 420. Therefore, the cloud server 2 or the edge server that has received sensor data after compression from the in-vehicle device 100 in the present embodiment is capable of execut-ing processing corresponding to a compression rate of the sensor data.

As a comparative example, when sensor data is com-pressed at a compression rate varying depending on vehicle state information and the compressed sensor data is solely transmitted to a cloud server or an edge server, on the side of the cloud server, the edge server, or the like that has received the compressed sensor data, the compression rate of the received compressed sensor data cannot be specified. Therefore, it is difficult to change processing according to the compression rate. Therefore, in the comparative example, the same processing is applied to sensor data having various data sizes and the like because compression rates are different. On the other hand, since the in-vehicle device 100 in the present embodiment transmits the com-pression rate in association with the compressed sensor data 420, the cloud server 2 or the edge server that has received the compressed sensor data 420 is capable of dividing the processing according to the compression rate and can improve the accuracy of the processing result.

The in-vehicle device 100 in the present embodiment generates the header-added sensor data 400 obtained by adding the compression rate determined according to the vehicle state information as the header data to the acquired sensor data, compresses the header-added sensor data 400 at the determined compression rate, and transmits the com-pressed header-added sensor data 400. Therefore, with the in-vehicle device 100 in the present embodiment, since the compression rate and the sensor data 420 can be integrally transmitted to the cloud server 2 or the like, it is easy to grasp a correspondence relation between the compression rate and the sensor data 420 on the reception side.

In the present embodiment, the vehicle state information includes at least the vehicle speed of the vehicle 1. The in-vehicle device 100 in the present embodiment determines to compress the sensor data 420 at the low compression rate when the vehicle speed is equal to or lower than the first threshold and determines to compress the sensor data 420 at the high compression rate when the vehicle speed is higher than the first threshold. Therefore, with the in-vehicle device 100 in the present embodiment, when the vehicle speed of the vehicle 1 is high, by increasing the compression rate of the sensor data 420 to shorten a data transmission time to the cloud server 2 or the like, it is possible to quickly obtain the processing result from the cloud server 2 or the like. In addition, with the in-vehicle device 100 in the present embodiment, when the vehicle speed of the vehicle 1 is low, it is possible to suppress the compression rate of the sensor data 420 to reduce deterioration of the sensor data 420 and improve the accuracy of the ADAS processing in the cloud server 2 or the like. In other words, the in-vehicle device 100 in the present embodiment can appropriately adjust the balance between the data transmission speed and the accu-racy of the ADAS processing according to the vehicle speed of the vehicle 1.

In the present embodiment, the sensor data 420 includes at least the image data obtained by imaging the surroundings of the vehicle 1. When the vehicle speed of the vehicle 1 is equal to or lower than the first threshold, the in-vehicle device 100 in the present embodiment determines the frame rate of the image data to be the low frame rate and the resolution of the image data to be the high resolution. When the vehicle speed of the vehicle 1 is higher than the first threshold, the in-vehicle device 100 in the present embodi-ment determines the frame rate of the image data to be the high frame rate and the resolution of the image data to be the low resolution. Therefore, with the in-vehicle device 100 in the present embodiment, in addition to the adjustment of the balance between the data transmission speed and the accu-racy of the ADAS processing by the compression rate, further, it is possible to adjust the balance between the data transmission speed and the accuracy of the ADAS process-ing corresponding to the vehicle speed of the vehicle 1 by the frame rate and the resolution.

The vehicle state information in the present embodiment includes at least one of the vehicle speed of the vehicle 1, the position of the vehicle 1, the state of the gears of the vehicle 1, the steering angle of the vehicle 1, the illuminance around the vehicle 1, the weather information around the vehicle 1, and the operation state of the wipers of the vehicle 1. Therefore, with the in-vehicle device 100 in the present embodiment, it is possible to appropriately adjust the balance between the data transmission speed and the accuracy of the ADAS processing according to not only the vehicle speed but also various states of the vehicle 1.

The cloud server 2 in the present embodiment receives the compressed sensor data 420 and the compression rate of the sensor data 420 from the in-vehicle device 100 and executes processing varying depending on the compression rate of the sensor data 420. Therefore, with the cloud server 2 in the present embodiment, it is possible to divide the processing according to the compression rate and it is possible to improve the accuracy of the processing result.

In addition, the cloud server 2 in the present embodiment executes the obstacle detection based on the sensor data 420 using the low compression rate detection threshold when the compression rate of the sensor data 420 is equal to or lower than the second threshold and executes the obstacle detection based on the sensor data 420 using the high compression rate detection threshold when the compression rate of the sensor data 420 is higher than the second threshold. Therefore, with the cloud server 2 in the present embodiment, when the image data with the high compression rate is used, it is possible to reduce detection omission of an obstacle by reducing the detection threshold for obstacle detection.

The cloud server 2 in the present embodiment causes the low compression rate learning model to learn the sensor data 420 when the compression rate is equal to or lower than the second threshold and causes the high compression rate learning model to learn the sensor data 420 when the compression rate is higher than the second threshold. Therefore, with the cloud server 2 in the present embodiment, by using a different learning model according to the compression rate, it is possible to further improve learning accuracy of a learning model than when a plurality of pieces of sensor data 420 having different compression rates are input to one learning model.

Second Embodiment

In the first embodiment explained above, the cloud server 2 executes the ADAS processing based on the sensor data 420 transmitted from the in-vehicle device 100. However, an execution subject of the ADAS processing is not limited to the cloud server 2. For example, an edge server may be the execution subject of the ADAS processing.

Figure 10:
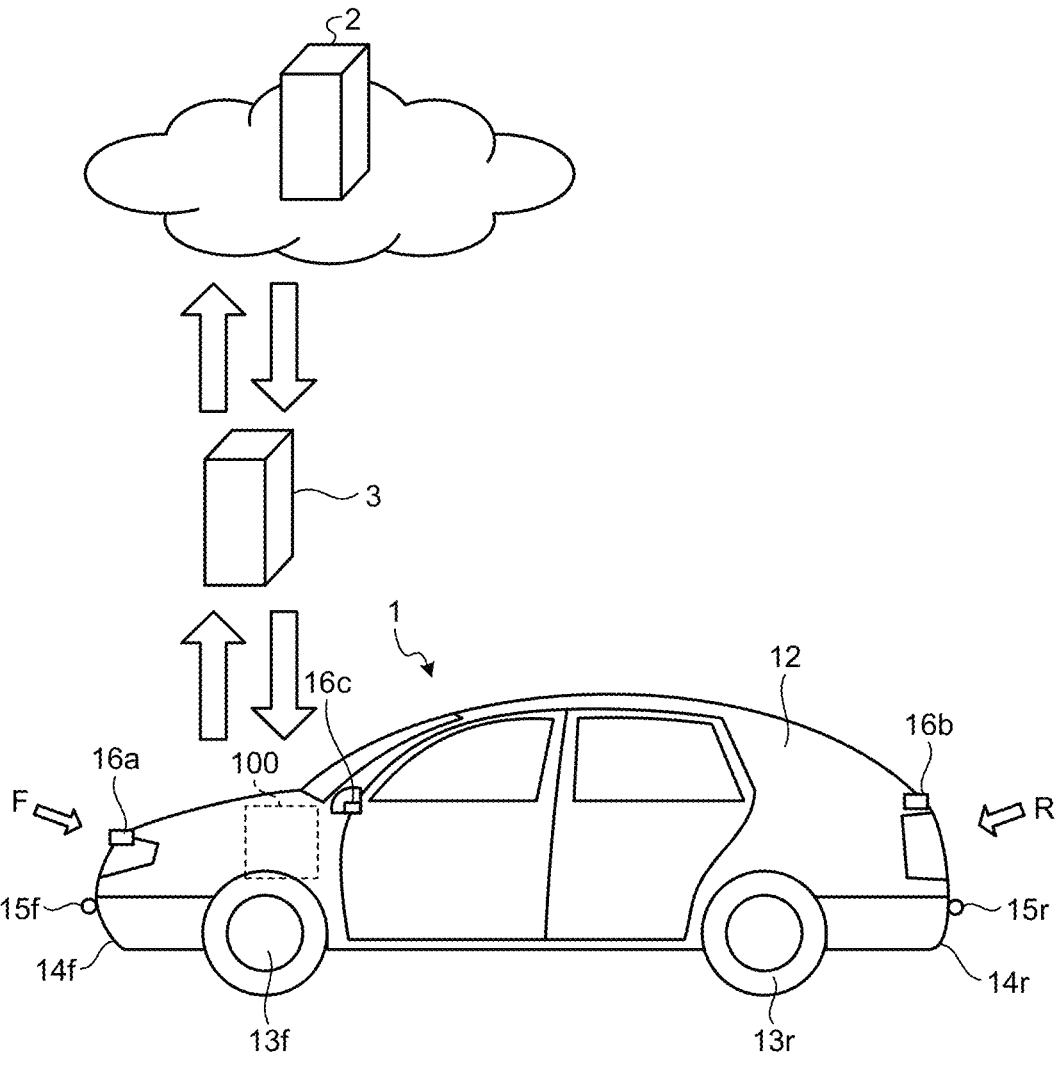
FIG. 10 is a diagram illustrating an example of information communication among a vehicle, an edge server, and a cloud server according to a second embodiment.

FIG. 10 is a diagram illustrating an example of information communication among the vehicle 1, an edge server 3, and the cloud server 2 according to a second embodiment. In the present embodiment, the edge server 3 and the cloud server 2 are examples of an information processing device.

The edge server 3 is a computer capable of storing processing of the in-vehicle device 100 with an edge computing technology. The edge server 3 includes, for example, a processor such as a CPU and storage devices such as a RAM, a ROM, and an HDD. The edge server 3 is provided, for example, in a communication base station, a traffic infrastructure facility, or the like and mutually performs information communication with the in-vehicle device 100 mounted on the vehicle 1 and the cloud server 2.

For example, in the present embodiment, the obstacle detection unit 202 and the estimation unit 204 in the ADAS processing unit 200 of the cloud server 2 in the first embodiment illustrated in FIG. 7 are included in the edge server 3. The learning unit 203 in the ADAS processing units 200 of the cloud server 2 in the first embodiment illustrated in FIG. 7 is included in the cloud server 2. Both of the edge server 3 and the cloud server 2 include functional units corresponding to the reception unit 201, the transmission unit 205, and the storage unit 210 of the cloud server 2 in the first embodiment illustrated in FIG. 7.

A reception unit of the edge server 3 receives the compressed header-added sensor data 400 from the in-vehicle device 100. The obstacle detection unit 202 and the estimation unit 204 of the edge server 3 execute processing corresponding to the compression rate like the obstacle detection unit 202 and the estimation unit 204 of the cloud server 2 in the first embodiment. A transmission unit of the edge server 3 transmits the vehicle control data based on the processing result by the obstacle detection unit 202 or the estimation unit 204 to the vehicle 1. The transmitting unit of the edge server 3 transmits the compressed header-added sensor data 400 received from the in-vehicle device 100 to the cloud server 2.

The reception unit of the cloud server 2 receives the compressed header-added sensor data 400 from the edge server 3. As in the first embodiment, the learning unit 203 of the cloud server 2 executes learning with a learning model corresponding to a compression rate of the header-added sensor data 400. In addition, the transmission unit of the cloud server 2 transmits a learned model learned by the learning unit 203 to the edge server 3. The learned model is used, for example, by the estimation unit 204 or the obstacle detection unit 202 of the edge server 3.

Since the edge server 3 includes the obstacle detection unit 202 and the learning unit 203 in this manner, the vehicle control data that is the processing result based on the header-added sensor data 400 can be transmitted to the in-vehicle device 100 more quickly than processing by the cloud server 2.

Since limitation on a storage capacity is generally smaller in the cloud server 2 than in the edge server 3, a large amount of the sensor data 420 can be learned by the cloud server 2 executing learning processing that takes time but does not affect driving control of the vehicle 1.

Note that, in FIG. 10, a case in which both of the edge server 3 and the cloud server 2 are used illustrated. However, alternatively, a configuration in which the cloud server 2 is absent and processing is performed by the edge server 3 and the in-vehicle device 100 may be adopted. In this case, the edge server 3 is an example of the information processing device.

Third Embodiment

Figure 11:
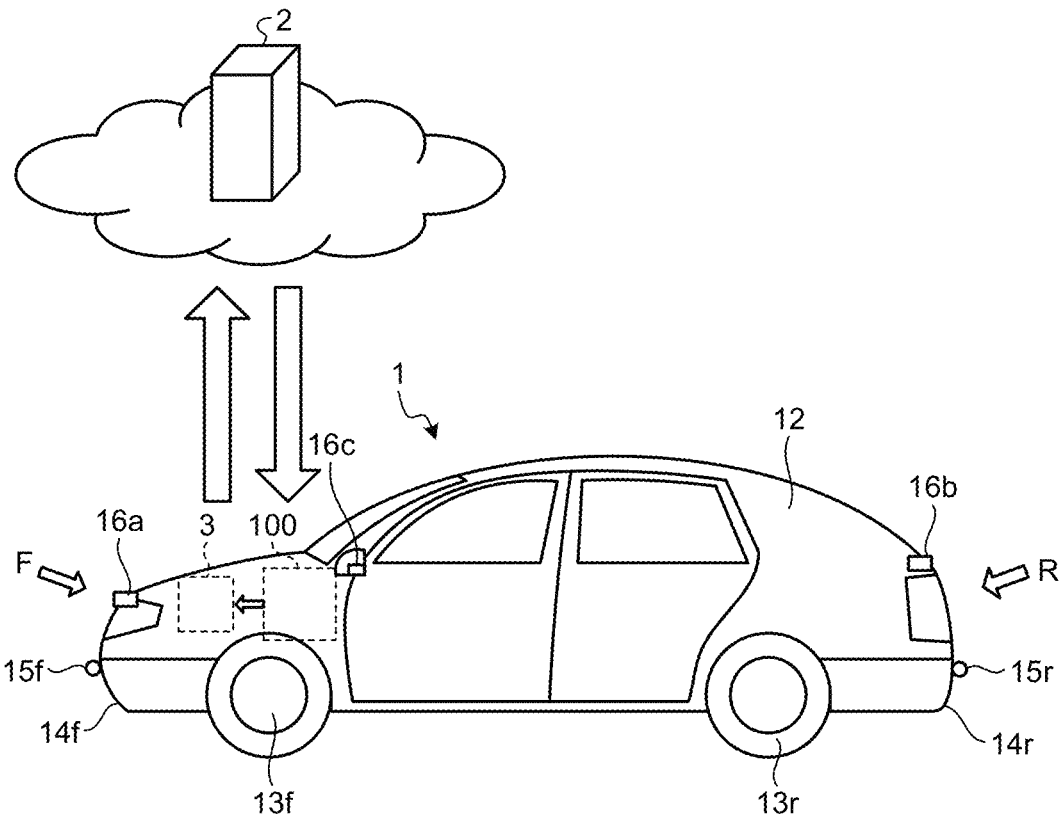
FIG. 11 is a diagram illustrating an example of information communication among a vehicle, an edge server, and a cloud server according to a third embodiment.

In the second embodiment explained above, the edge server 3 is provided outside the vehicle 1. However, the edge server 3 may be provided in the vehicle 1. FIG. 11 is a diagram illustrating an example of information communication among the vehicle 1, the edge server 3, and the cloud server 2 according to a third embodiment.

As illustrated in FIG. 11, the edge server 3 in the present embodiment is mounted on the vehicle 1 like the in-vehicle device 100. The edge server 3 is mounted on the vehicle 1 as explained above, whereby the in-vehicle device 100 and the edge server 3 can be connected by wire in the vehicle 1 and improvement in communication speed is expected.

The functions of the in-vehicle device 100, the cloud server 2, and the edge server 3 in the embodiments explained above are implemented, for example, by the CPU executing programs. The programs executed by the in-vehicle device 100, the cloud server 2, and the edge server 3 in the embodiments explained above is provided by being recorded in a computer-readable recording medium such as a CD-ROM, a CD-R, a DVD (Digital Versatile Disk), or a flash memory as a file in an installable format or an executable format.

The programs executed by the in-vehicle device 100, the cloud server 2, and the edge server 3 in the embodiments explained above may be stored in a computer connected to a network such as the Internet and provided by being downloaded via the network. The programs executed by the in-vehicle device 100, the cloud server 2, and the edge server 3 in the embodiments explained above may be provided or distributed via a network such as the Internet.

The programs executed by the in-vehicle device 100, the cloud server 2, and the edge server 3 in the embodiments explained above may be provided by being incorporated in a ROM or the like in advance.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An in-vehicle device comprising:
a processor; and
a memory having instructions that, when executed by the processor, cause the processor to perform operations comprising:
    acquiring vehicle state information indicating a state of a vehicle, and sensor data measured by a sensor provided on the vehicle,
    determining a first compression rate or a second compression rate of the sensor data according to the vehicle state information,
    compressing the sensor data at the first compression rate or the second compression rate depending on the vehicle state information, and
    transmitting the first compression rate or the second compression rate in association with the compressed sensor data, wherein
the vehicle state information includes at least vehicle speed of the vehicle,
the first compression rate is determined in case the vehicle speed is equal to or lower than a first threshold, and
the second compression rate is higher than the first compression rate and is determined in case the vehicle speed is higher than the first threshold.

2. The in-vehicle device according to claim 1, wherein
the processor to perform operations further comprising:
    determining a compression rate of the sensor data according to the vehicle state information; and
    generating compression-rate-added sensor data obtained by adding the determined compression rate to the sensor data, and
the compression-rate-added sensor data is compressed at the determined compression rate and transmitted.

3. The in-vehicle device according to claim 1, wherein
the sensor data includes at least image data obtained by imaging surroundings of the vehicle, and
the processor to perform operations further comprising:

determining a frame rate of the image data to be a first frame rate when the vehicle speed is equal to or lower than the first threshold;
    determining the frame rate of the image data to be a second frame rate higher than the first frame rate when the vehicle speed is higher than the first threshold; and
    editing the image data based on the determined frame rate.

4. The in-vehicle device according to claim 1, wherein
the sensor data includes at least image data obtained by imaging surroundings of the vehicle, and
the processor to perform operations further comprising:
    determining a resolution of the image data to be a first resolution when the vehicle speed is equal to or lower than the first threshold;
    determining the resolution of the image data to be a second resolution lower than the first resolution when the vehicle speed is higher than the first threshold; and
    editing the image data based on the determined resolution.

5. The in-vehicle device according to claim 1, wherein the vehicle state information includes at least one of vehicle speed of the vehicle, a position of the vehicle, a state of a gear of the vehicle, a steering angle of the vehicle, illuminance around the vehicle, weather information around the vehicle, or an operation state of a wiper of the vehicle.

6. A sensor data transmission method comprising:
    acquiring vehicle state information indicating a state of a vehicle and sensor data measured by a sensor provided on the vehicle;
    determining a first compression rate or a second compression rate of the sensor data according to the vehicle state information;
    compressing the sensor data at the first compression rate or the second compression rate depending on the vehicle state information; and
    transmitting the first compression rate or the second compression rate in association with the compressed sensor data, wherein
the vehicle state information includes at least vehicle speed of the vehicle, and
the first compression rate is determined in case the vehicle speed is equal to or lower than a first threshold, and
the second compression rate is higher than the first compression rate and is determined in case the vehicle speed is higher than the first threshold.

7. The sensor data transmission method according to claim 6, further comprising:
    determining a compression rate of the sensor data according to the vehicle state information; and
    generating compression-rate-added sensor data obtained by adding the determined compression rate to the sensor data, wherein
the compression-rate-added sensor data is compressed at the determined compression rate, and
the compressed compression-rate-added sensor data is transmitted.

8. The sensor data transmission method according to claim 6, wherein
the sensor data includes at least image data obtained by imaging surroundings of the vehicle,
the sensor data transmission method further comprises:
    determining a frame rate of the image data to be a first frame rate when the vehicle speed is equal to or lower than the first threshold; and determining the frame rate of the image data to be a second frame rate higher than the first frame rate when the vehicle speed is higher than the first threshold, and the image data is edited based on the determined frame rate.

9. The sensor data transmission method according to claim 6, wherein the sensor data includes at least image data obtained by imaging surroundings of the vehicle, the sensor data transmission method further comprises:

determining a resolution of the image data to be a first resolution when the vehicle speed is equal to or lower than the first threshold; and determining the resolution of the image data to be a second resolution lower than the first resolution when the vehicle speed is higher than the first threshold, and the image data is edited based on the determined resolution.

10. The sensor data transmission method according to claim 6, wherein the vehicle state information includes at least one of vehicle speed of the vehicle, a position of the vehicle, a state of a gear of the vehicle, a steering angle of the vehicle, illuminance around the vehicle, weather information around the vehicle, or an operation state of a wiper of the vehicle.

\* \* \* \* \*